United States Patent [19]
Moran et al.

[11] Patent Number: 6,102,105
[45] Date of Patent: Aug. 15, 2000

[54] REPAIR OF ELECTRICAL GENERATOR STATOR LEAKS, CRACKS AND CREVICES

[75] Inventors: Thomas E. Moran; Bruce William Schafer, both of Lynchburg; Richard J. Fiola, Forest; Stanley Mark Gryder, Lynchburg, all of Va.

[73] Assignee: Framatome Technologies, Inc., Lynchburg, Va.

[21] Appl. No.: 08/906,319

[22] Filed: Aug. 6, 1997

[51] Int. Cl.$^7$ .................. F28F 7/00; B23P 6/00; B32B 35/00; B05C 13/00
[52] U.S. Cl. .................. 165/76; 29/402.18; 138/97; 156/94; 427/142; 427/235; 264/36.16
[58] Field of Search .................. 29/596, 402.18; 310/42, 54; 138/97; 165/76; 156/94; 427/142, 230, 235, 236, 239, 299, 333; 264/36.16; 118/DIG. 12, 408, 410

[56] References Cited

U.S. PATENT DOCUMENTS

| | | |
|---|---|---|
| 2,713,908 | 7/1955 | Curtis . |
| 3,034,479 | 5/1962 | Larsh et al. . |
| 3,556,831 | 1/1971 | Gottschalkstr . |
| 3,578,479 | 5/1971 | Packo . |
| 3,711,309 | 1/1973 | Packo . |
| 3,749,056 | 7/1973 | Primus et al. . |
| 3,947,610 | 3/1976 | Bodmer et al. . |
| 3,982,050 | 9/1976 | Kato et al. . |
| 4,036,170 | 7/1977 | Goodheim . |
| 4,165,400 | 8/1979 | DeMarco . |
| 4,237,172 | 12/1980 | Packo et al. . |
| 4,289,091 | 9/1981 | Warner . |
| 4,304,805 | 12/1981 | Packo et al. . |
| 4,311,112 | 1/1982 | Siebeneichen . |
| 4,323,803 | 4/1982 | Danko et al. . |
| 4,331,722 | 5/1982 | Packo et al. . |
| 4,372,988 | 2/1983 | Bahder . |
| 4,521,453 | 6/1985 | Mulcahy . |
| 4,582,551 | 4/1986 | Parkes et al. . |
| 4,614,226 | 9/1986 | Ryan ......................................... 165/76 |
| 4,776,082 | 10/1988 | Janzer ....................................... 29/598 |
| 4,869,928 | 9/1989 | Kurumatani et al. . |
| 4,959,569 | 9/1990 | Snuttjer et al. . |
| 5,020,577 | 6/1991 | McMillian . |
| 5,104,691 | 4/1992 | Edwards et al. . |
| 5,194,193 | 3/1993 | Humphreys et al. . |
| 5,499,659 | 3/1996 | Naf . |
| 5,545,433 | 8/1996 | Aanestad . |
| 5,557,837 | 9/1996 | Thiard-Laforest et al. .............. 29/596 |
| 5,622,209 | 4/1997 | Naf . |

*Primary Examiner*—David P. Bryant
*Attorney, Agent, or Firm*—Rhodes & Mason, PLLC

[57] ABSTRACT

A system for repairing leaks, cracks and crevices in a stator assembly of the type having a fluid cooling system. The system includes an anaerobically activated, liquid polymer curable sealant supply which is circulated through the fluid cooling system of the stator assembly. Sealant connectors place the sealant supply in fluid communication with the cooling system and a pump circulates the curable sealant supply through the cooling system to repair the leaks, cracks and crevices in the stator assembly. In the preferred embodiment, a secondary curing system provides an initial curing of the curable sealant to form a protective "skin" after the removal of the excess curable sealant from the fluid cooling system.

36 Claims, 4 Drawing Sheets

REPAIR OF ELECTRICAL GENERATOR STATOR LEAKS, CRACKS AND CREVICES

BACKGROUND OF THE INVENTION (1) Field of the Invention

The present invention relates generally to stator winding bars and, more particularly, to an apparatus and method for repairing electrical generator stator leaks, cracks and crevices as may be generally classified in United States Patent and Trademark Office Classification 29/596.

(2) Description of the Prior Art

Certain electrical devices, for example, power generators, have water cooled stator bars. The stator windings comprise insulated copper bars that are assembled in slots and brazed into copper clips on the ends to form bar assemblies. Each stator bar includes a combination of solid and hollow copper conductors, referred to as strands. The hollow strands provide a means for circulating coolant through the strand package to prevent the machine from overheating and to increase the output of the generator by removing heat from the insulated stator bars. The copper clips themselves form water boxes on either end of the stator bars and have coolant water openings or connections formed therethrough.

Leaks within stator bars are caused by corrosion of the brazed joints and/or porosity in the clip casting. Prior art methods for repairing leaking stator bars involve varying degrees of generator disassembly to fix individual clips, or in some cases, complete removal and replacement of the stator bars. Either option requires considerable downtime to gain access to the stator bars, which makes these repairs costly and time consuming.

U.S. Pat. No. 5,557,837 to Thiard-Laforet et al. discloses a method for repairing stator winding bars. In the disclosed method, the existing connecting device is removed from the bar end by inductive heating. The bar end is cleaned in the region where the new connecting device is intended to be mounted. The end surface of the bar end is material cutting machined. Narrow slots are introduced between adjacent conductor elements into the end of the bar in the transverse and vertical directions. A first connecting part which is made of copper and completely surrounds the bar end is pushed on. Remaining gaps between the first connecting part and the outer surfaces of the bar end are filled with copper foil and/or solder foil. The narrow slots are filled with copper foil and/or solder foil or a combination of both. The first connecting part and the bar end are inductively heated and soldered with the addition of solder. The solder joint thus created is inspected and a second connecting part is fitted to the free end surface of the first connecting part by soldering. The sealing of the resulting connecting device is tested.

U.S. Pat. No. 4,776,082 to Janzer discloses an electric motor repair. The method includes drilling holes through the armature at various locations around the armature and along its length. The holes extend to the armature shaft. Adhesive is injected into the holes, under pressure, and fills any voids between the laminations and between the armature and the shaft.

U.S. Pat. No. 4,614,226 to Ryan discloses a vehicle heater repair apparatus and method. The apparatus has a closed loop pipe system removably connected to vehicle heater input and output lines which have been disconnected from the engine under the vehicle hood. The water inlet is connected to a water source for allowing the injection of water into the pipe system. A valve allows the water to be shut on or off. A pump is connected to the pipe system. Sealant solution and cleaning solution tanks are connected to the piping system for first injecting a cleaning solution for circulation through the vehicle heater core and later for circulating a sealing solution. An electrical heater is also connected to the pipe system for heating the liquids. The pipe system has a drain connection through a valve and through a pressure relief valve for dumping the water and the cleaning solution and the sealant solution after the cleaning and sealing has been completed. The cleaning solution tank and the sealing solution tank are connected to a source of air for applying the solutions under pressure into the piping system.

Thus, there remains a need for a new and improved apparatus and method for repairing leaks, cracks, and crevices in water cooled stator bars of electrical generators which does not require partial or complete disassembly of the stator bars or clips while, at the same time, does not adversely affect the performance of the generator.

SUMMARY OF THE INVENTION

The present invention is directed to a system for repairing leaks, cracks and crevices in a stator assembly of the type having a fluid cooling system. The system includes an anaerobically activated, liquid polymer curable sealant supply which is circulated through the fluid cooling system of the stator assembly. Sealant connectors place the sealant supply in fluid communication with the cooling system and a pump circulates the curable sealant supply through the cooling system to repair the leaks, cracks and crevices in the stator assembly. In the preferred embodiment, a secondary curing system provides an initial curing of the curable sealant to form a protective "skin" after the removal of the excess curable sealant from the fluid cooling system.

Accordingly, one aspect of the present invention is to provide a system for repairing leaks, cracks and crevices in a stator assembly of the type having a fluid cooling system, the system including: (a) a curable sealant supply; (b) sealant connectors for placing the sealant supply in fluid communication with the cooling system; and (c) sealant circulating means for circulating the curable sealant supply through the cooling system to repair the leaks, cracks and crevices in the stator assembly.

Another aspect of the present invention is to provide a system for repairing leaks, cracks and crevices in a stator assembly of the type having a fluid cooling system, the system including: (a) an anaerobically activated, liquid polymer curable sealant supply; (b) sealant connectors for placing the sealant supply in fluid communication with the cooling system; and (c) sealant circulating means for circulating the curable sealant supply through the cooling system to repair the leaks, cracks and crevices in the stator assembly.

Still another aspect of the present invention is to provide a system for repairing leaks, cracks and crevices in a stator assembly of the type having a fluid cooling system, the system including: (a) an anaerobically activated, liquid polymer curable sealant supply; (b) sealant connectors for placing the sealant supply in fluid communication with the cooling system; (c) sealant circulating means for circulating the curable sealant supply through the cooling system to repair the leaks, cracks and crevices in the stator assembly; and (d) a secondary curing system for providing an initial curing of the curable sealant after the removal of the excess curable sealant from the fluid cooling system.

These and other aspects of the present invention will become apparent to those skilled in the art after a reading of

DESCRIPTION OF THE PREFERRED EMBODIMENTS

Figure 1:
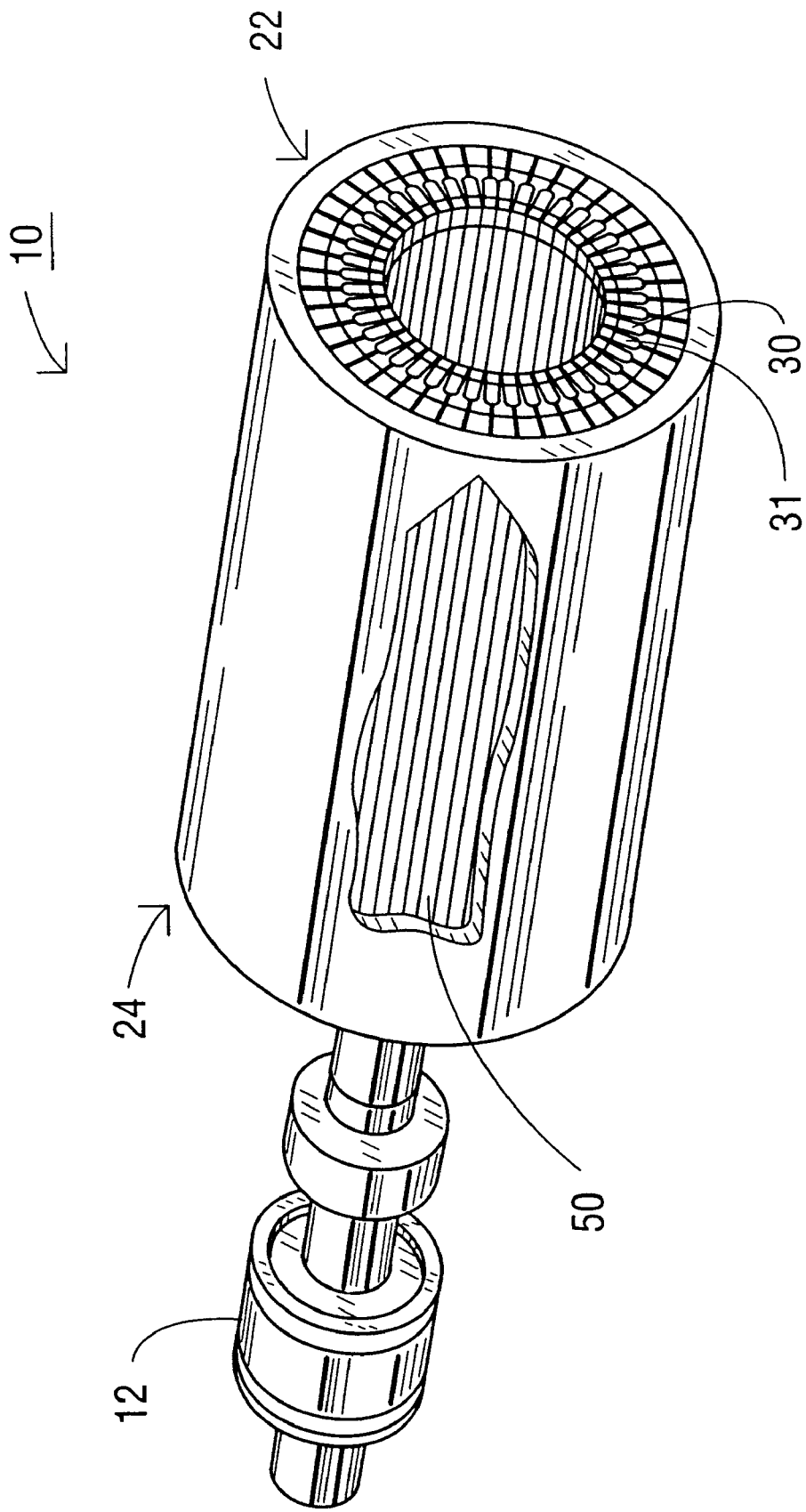
FIG. 1 is a perspective, fragmentary view of a conventional electrical generator to be repaired according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a conventional electrical generator 10 is shown therein. Generator 10 has rotor 12 (shown removed), feed or inlet header ring 22, outlet header ring 24, and a plurality of stator bars 50 extending between header rings 22 and 24 and, more particularly, between a plurality of clips.

Figure 2:
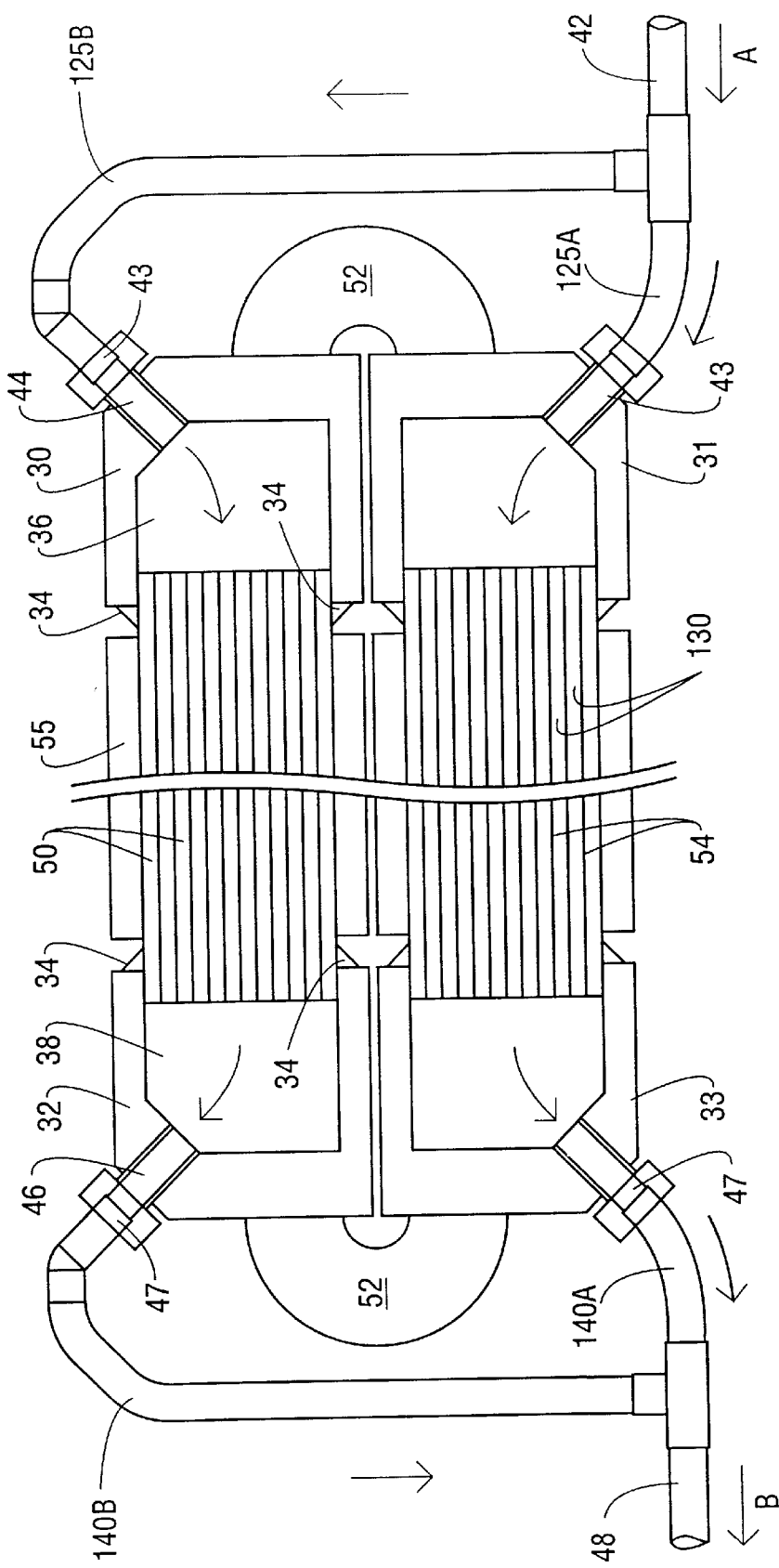
FIG. 2 is a side, cross sectional, schematic, fragmentary view of a stator bar assembly, a portion of an associated cooling system, and a portion of a sealant repair system constructed according to the present invention.

For example, with reference to FIG. 2, stator bars 50 extend between clips 30 and 32 and between clips 31 and 33. Clips 30, 31, 32, 33 are secured to the ends of stator bars 50 by brazing 34. The individual hollow and solid strands 130 are secured together by brazing 54. Because clips 31, 33 and the other clips of the generator are constructed in the same fashion as clips 30, 32, the remaining description of the invention will be made with reference to clips 30 and 32 and the associated elements of the stator assembly only.

Clip 30 and the inlet end of stator bars 50 define inlet water box 36. Clip 32 and the outlet end of the stator bars define outlet water box 38. Adjacent clips 30, 31, 32, 33 are connected by electrical connections 52. Ground wall insulation 55 is provided around each strand package.

Figure 3:
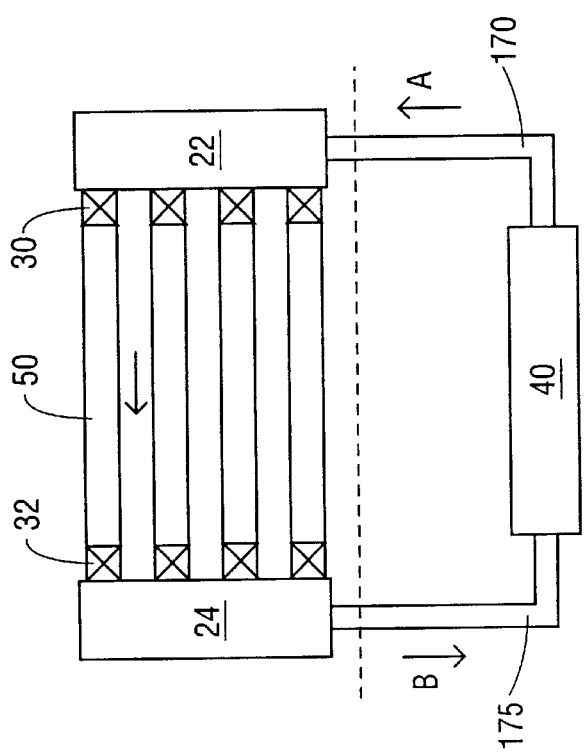
FIG. 3 is a schematic view of the stator bar assembly and the cooling system.

In conventional fashion, coolant (typically water) flows in direction A from pump 40, into supply piping 170 through header ring 22 into TEFLON® hose 42 and stainless steel tubing 125A and 125B (see FIGS. 2 and 3). The coolant flows in the directions of the arrows through connections 43, openings 44, and into water box 36. Some of stator bar strands 130 are hollow along their length so that the coolant flows through the stator bars, through opening 46, connector 47, stainless steel tubing 140A and 140B, and finally returns in direction B (see FIGS. 2 and 3) through TEFLON hose 48 to the header ring 24, drainage piping 175, and to pump 40.

The above described network of clips, electrical connections, stator bars, strands, hoses, coolant supply, and pump typically form a part of the conventional fluid cooled electrical generator. The apparatus and method of the present invention utilize this existing structure to effect repair of leaks, cracks, and crevices in the stator bar assemblies. More particularly, in the manner described below, the apparatus and method of the present invention may be used to repair cracks and crevices, for example, in and between stator bars, at the brazings 34 and 54, and in the clips 30, 31, 32, 33.

Figure 4:
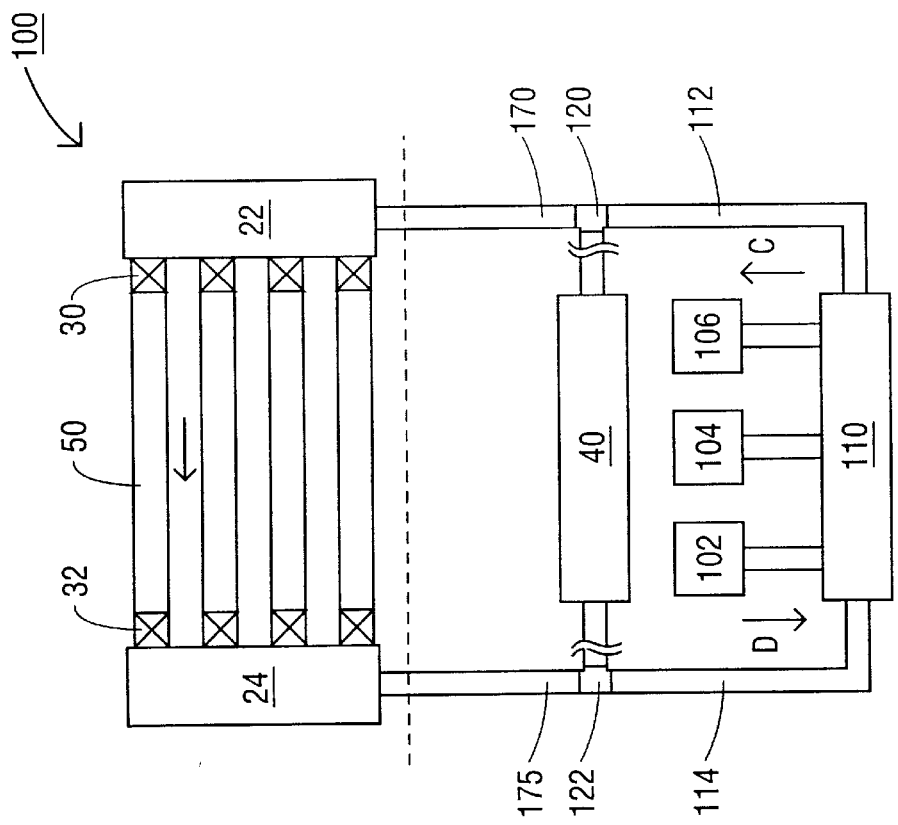
FIG. 4 is a schematic view of the stator bar assembly and the cooling system of FIG. 3 along with the sealant system of the present invention.

With reference to FIGS. 2 and 4, sealant system 100 includes generally pump and valve assembly 110, sealant supply 102, flush supply 104, curing agent/accelerator supply 106, inlet hose 112, and outlet hose 114. Assembly 110 includes a pump and suitable valves for selectively drawing each of the sealant, curing agent/accelerator, and flush supplies.

Figure 5:
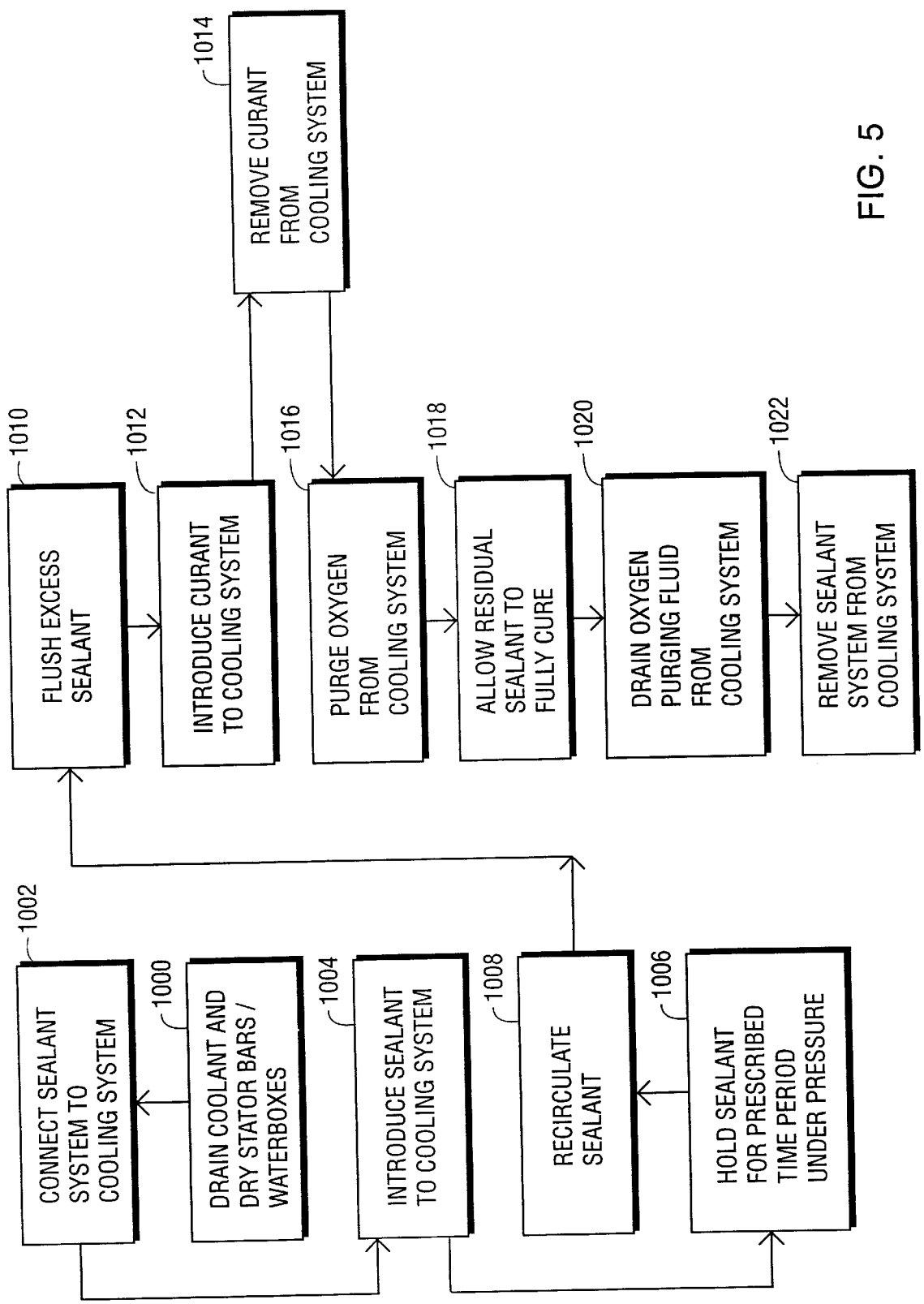
FIG. 5 is a schematic flow chart showing the steps of a method for repairing an electrical generator according to the present invention.

With reference to FIG. 5, when it is desired to repair a stator assembly using the present invention, the coolant is drained from the stator assembly and cooling system inlet and outlet hoses. The stator bars, water boxes, and inlet and outlet hoses are dried using circulating air, vacuum or by some other conventional means (step 1000). The sealant system is connected to accessible piping 170 and 175 outside the generator stator coolant header (step 1002, FIG. 5). As shown, inlet hose 112 is connected to inlet piping 170 by connector 120 (1002) and outlet hose 114 is connected to outlet piping 175 by connector 122. It will be appreciated by those of ordinary skill in the art that the sealant system may be connected to the coolant system by other means as well.

In step 1004, a liquid sealant 102 is vacuum drawn or pumped by pump 110 through inlet hose 112 in direction C and through the clips and stator bars along the same course as the coolant. The sealant exits the clips and returns along direction D through hoses 140A, 140B, 48, 175 and 114. The sealant is preferably a liquid polymer. The sealant preferably has a viscosity and density about equal to the density of water to permit it to be more easily circulated. The sealant is preferably of the type which cures anaerobically (in the absence of air) by being catalyzed or reacting chemically with certain materials, such as the copper in the generator cooling system. In its cured state, the sealant tightly adheres to the parent material, filling voids with a solid polymer.

Sealants as typically used commercially for vacuum impregnation of castings and other products with porosity or small surface imperfections may be used. Suitable sealant materials include HPS 990 available from Hernon Manufacturing of Sanford, Fla.

Once the stator assembly is flooded with the sealant, the sealant is held in the cooling system under a prescribed pressure for a prescribed period of time (step 1006). Preferably, the sealant is held at a pressure of from about 20 psig to about 80 psig and for from about ½ to 6 hours. Thereafter, the sealant is recirculated (step 1008) to assure that all areas of the stator bars are fully coated by the sealant.

Next, the flush supply 104 is drawn by pump 110 through the inlet hoses, the water boxes, the stator bars, and the outlet hoses at a prescribed flow rate and pressure and for a prescribed period of time (step 1010). The flush supply is preferably water and serves to flush excess sealant (i.e., sealant not disposed in the cracks or crevices intended to be filled) from the stator assembly and inlet and outlet hoses. It is important that the pressure, flow rate, and flush time be chosen so as to ensure that substantially all excess sealant is removed, thereby ensuring that the sizes of the passages of the cooling system are not reduced which may cause an increased pressure drop through the cooling system. In particular, the flush supply hollow strand velocity should be from about 2 to 8 feet per second (ft/sec). The flush supply should be forced through the stator assembly for from about 5 to 60 minutes at a pressure of from about 10 to 60 psig.

In step 1012, curing agent/accelerator supply 106 is pumped through the inlet hoses, the stator assembly, and the outlet hoses by pump 110. The curing agent/accelerator serves to cure the exposed sealant, creating an initial protective "skin" over the openings of the cracks and crevices which are still filled with liquid sealant. Suitable curing agents/accelerator materials include HPS 29 available from Hernon Manufacturing of Sanford, Fla.

After the protective "skin" is formed, the curing agent/accelerator is removed from the cooling system (step 1014) and oxygen is purged from the cooling system (step 1016) to allow the sealant to finish curing. In the preferred embodiment, the oxygen is purged from the cooling system by flooding the cooling system with flush supply 106 (preferably water) provided by pump 110. The sealant in the repair areas and the flush supply remain in this state for a time sufficient for the sealant to fully cure (step 1018). This step typically takes on the order of from about 5 to 40 hours. Once the sealant is fully cured, the oxygen purging fluid (water) is drained from the cooling system (step 1020) and sealant system 100 is removed from the cooling system (step 1022).

The present invention, as described above, for repairing stator assemblies provide numerous benefits over conventional apparatus and methods for making such repairs. Primarily, the present method does not require disassembly of the stator assembly, thereby significantly reducing the expense, inconvenience, and time required to effect such repairs. Moreover, because the sealant follows the same path as the coolant, each of the cracks and crevices which are at risk of allowing leakage of the coolant are addressed. The velocity of the water in the hollow strands during the flush step may be controlled to ensure that substantially all excess sealant is removed, thereby ensuring that no additional pressure drop is created by the repair. It has been found that the sealant is effective in flowing into tight crevices and holes, through capillary action, thereby closing off small cracks. This is advantageous because many of the existing cracks in the brazed material may not penetrate through the full length of the braze but instead only go partially through the thickness. For these cracks, the sealant fills and seals the crevice, eliminating the environment that caused the cracking by sealing off the bottom of the crack location to additional water intrusion. Also, if the crack does not propagate completely through the thickness of the braze, the sealant will eliminate the concern of a leak at that location.

The preferred sealant, as described above, also provides several distinct advantages. The sealant does not chemically attack existing copper oxides. Thus, if sealed copper oxide is eroded away, exposing uncoated copper, galvanic attack will not occur. Since the sealant components are selected to cross link with the polymer, the potential from leeching is minimized. Once cured, the sealant is effectively inert and the cooling water chemistry will not effect the sealant. The sealant has little or no effect on materials within the cooling system that it comes in contact with, other than the copper stator bar pieces, since the sealant is mainly active with copper. Further, the sealant life, under typical generator operating conditions, is acceptable because of the good mechanical and thermal properties of the plastic thermoset resin. Also, the electrical properties of the generator stator bars are not expected to affect the life of the sealant. Finally, the energy levels associated with the generator's strong magnetic field will not damage the sealant since this energy type does not damage polymerized sealant.

Certain modifications and improvements will occur to those skilled in the art upon a reading of the foregoing description. By way of example, different sealants may require changes in the time, velocity, flow rate and pressure conditions. Also, an air flow step may be added after the sealant application to remove excess sealant from the system. It should be understood that all such modifications and improvements have been deleted herein for the sake of conciseness and readability but are properly within the scope of the following claims.

We claim:

1. A system for repairing leaks, cracks and crevices in a stator assembly of the type having a fluid cooling system, said system comprising:

(a) a supply of a curable fluid sealant;

(b) sealant connectors for placing said supply of said curable fluid sealant in fluid communication with the cooling system;

(c) sealant circulating means for circulating said curable fluid sealant through the cooling system to repair the leaks, cracks and crevices in said stator assembly; and (d) a secondary curing system for providing an initial curing of said curable fluid sealant after the removal from said fluid cooling system of said curable fluid sealant in excess of an amount of said curable fluid sealant that is sufficient to substantially coat and seal the leaks, cracks and crevices in said stator assembly.

2. The apparatus according to claim 1, wherein said secondary curing system includes: (i) a secondary curing agent/accelerator supply for curing at least a portion of said sealant supply; (ii) secondary curing agent/accelerator connectors for placing said secondary curing agent/accelerator supply in fluid communication with the cooling system; and (iii) secondary curing agent/accelerator circulating means for moving said secondary curing agent/accelerator supply through the cooling system.

3. The apparatus according to claim 2, wherein said secondary curing agent/accelerator supply is a liquid.

4. The apparatus according to claim 3, wherein said secondary curing agent/accelerator supply is a sealant activator.

5. The apparatus according to claim 2, wherein said secondary curing agent/accelerator connectors include: (i) a curing agent/accelerator inlet hose in fluid communication with said secondary curing agent/accelerator circulating means and adapted to engage an inlet header, said inlet header in fluid communication with the cooling system; and (ii) a curing agent/accelerator outlet hose in fluid communication with said secondary curant circulating means and adapted to engage an outlet header, said outlet header in fluid communication with the cooling system.

6. The apparatus according to claim 5, wherein said secondary curing agent/accelerator connectors is the same as said sealant connectors.

7. The apparatus according to claim 2, wherein said secondary curing agent/accelerator circulating means includes a pump.

8. The apparatus according to claim 7, wherein said secondary curing agent/accelerator circulating means is the same as said sealant circulating means.

9. The apparatus according to claim 7, wherein said pump, when actuated to move said secondary supply, creates a flow velocity in a plurality of hollow strands within said stator assembly of from about 2 to 8 ft/sec.

10. The apparatus according to claim 9, wherein said pump is actuated for a time period of from about 5 to 30 minutes.

11. A system for repairing leaks, cracks and crevices in a stator assembly of the type having a fluid cooling system, said system comprising:
(a) a supply of a curable fluid sealant, wherein said curable sealant is an anaerobically activated, liquid polymer;
(b) sealant connectors for placing said supply of said curable fluid sealant in fluid communication with the cooling system;
(c) sealant circulating means for circulating said curable fluid sealant through the cooling system to repair the leaks, cracks and crevices in said stator assembly; and
(d) a secondary curing system for providing an initial curing of said curable fluid sealant after the removal from said fluid cooling system of said curable fluid sealant in excess of an amount of said curable fluid sealant that is sufficient to substantially coat and seal the leaks, cracks and crevices in said stator assembly.

12. The apparatus according to claim 11, wherein said secondary curing system includes: (i) a secondary curing agent/accelerator supply for curing at least a portion of said sealant supply; (ii) secondary curing agent/accelerator connectors for placing said secondary curing agent/accelerator supply in fluid communication with the cooling system; and (iii) secondary curing agent/accelerator circulating means for moving said secondary curing agent/accelerator supply through the cooling system.

13. The apparatus according to claim 12, wherein said secondary curing agent/accelerator supply is a liquid.

14. The apparatus according to claim 13, wherein said secondary curing agent/accelerator supply is a sealant activator.

15. The apparatus according to claim 12, wherein said secondary curing agent/accelerator connectors include: (i) a curing agent/accelerator inlet hose in fluid communication with said secondary curant circulating means and adapted to engage an inlet header, said inlet header in fluid communication with the cooling system; and (ii) a curing agent/accelerator outlet hose in fluid communication with said secondary curing agent/accelerator circulating means and adapted to engage an outlet header, said outlet header in fluid communication with the cooling system.

16. The apparatus according to claim 15, wherein said secondary curing agent/accelerator connectors is the same as said sealant connectors.

17. The apparatus according to claim 12, wherein said secondary curing agent/accelerator circulating means includes a pump.

18. The apparatus according to claim 17, wherein said secondary curing agent/accelerator circulating means is the same as said sealant circulating means.

19. The apparatus according to claim 17, wherein said pump, when actuated to move said secondary supply, creates a flow velocity in a plurality of hollow strands within said stator assembly of from about 2 to 8 ft/sec.

20. The apparatus according to claim 19, wherein said pump is actuated for a time period of from about 5 to 30 minutes.

21. The apparatus according to claim 11, wherein said sealant connectors include: (i) a sealant inlet hose in fluid communication with said sealant circulating means and adapted to engage an inlet header, said inlet header in fluid communication with the cooling system; and (ii) a sealant outlet hose in fluid communication with said sealant circulating means and adapted to engage an outlet header, said outlet header in fluid communication with the cooling system.

22. The apparatus according to claim 21, wherein said sealant circulating means includes a pump.

23. The apparatus according to claim 22, wherein said pump when actuated to move the sealant supply creates a pressure in the cooling system of from about 20 to 80 psig.

24. The apparatus according to claim 23, wherein said pump is actuated for a time period of from about ½ to 6 hours.

25. The apparatus according to claim 11, further including a drying system.

26. The apparatus according to claim 25, wherein said drying system includes an evaporator medium and evaporator circulating means for moving said evaporator medium through the cooling system.

27. The apparatus according to claim 11, further including a flushing system operative to flush excess sealant supply from the cooling system.

28. The apparatus according to claim 27, wherein said flushing system includes: (i) a flush supply for displacing excess sealant supply from the cooling system; (ii) flushing connectors for placing said flush supply in fluid communication with the cooling system; and (iii) flushing circulating means for moving said flush supply through the cooling system.

29. The apparatus according to claim 28, wherein said flush supply is an anaerobic liquid.

30. The apparatus according to claim 29, wherein said flush supply is water.

31. The apparatus according to claim 28, wherein said flushing connectors include: (i) a flushing inlet hose in fluid communication with said flushing circulating means and adapted to engage said inlet header; and (ii) a flushing outlet hose in fluid communication with the flushing circulating means and adapted to engage said outlet header.

32. The apparatus according to claim 31, wherein said flushing connectors are the same as said sealant connectors.

33. The apparatus according to claim 28, wherein said flushing circulating means includes a pump.

34. The apparatus according to claim 33, wherein said flushing circulating means is the same as said sealant circulating means.

35. The apparatus according to claim 33, wherein said pump, when actuated to move said flush supply, creates a flow velocity in a plurality of hollow strands within said stator assembly of from about 2 to 8 ft/sec.

36. The apparatus according to claim 35, wherein said pump is actuated for a time of from about 5 to 60 minutes.

* * * * *